(12) United States Patent
Bremond et al.

(10) Patent No.: US 7,746,618 B2
(45) Date of Patent: Jun. 29, 2010

(54) PROTECTION OF A COMMUNICATION LINE

(75) Inventors: André Bremond, Veretz (FR); Cédric Appere, Tours (FR)

(73) Assignee: STMicroelectronics S.A., Montrouge (FR)

( * ) Notice: Subject to any disclaimer, the term of this patent is extended or adjusted under 35 U.S.C. 154(b) by 67 days.

(21) Appl. No.: 11/881,177

(22) Filed: Jul. 26, 2007

(65) Prior Publication Data
US 2008/0049369 A1 Feb. 28, 2008

(30) Foreign Application Priority Data
Jul. 28, 2006 (FR) .................................. 06 53166

(51) Int. Cl.
*H02H 1/00* (2006.01)
(52) U.S. Cl. ........................................ 361/119; 361/117
(58) Field of Classification Search ......... 361/117–120, 361/127
See application file for complete search history.

(56) References Cited

U.S. PATENT DOCUMENTS

| 3,454,860 | A | | 7/1969 | Burket et al. | |
|---|---|---|---|---|---|
| 4,322,767 | A | * | 3/1982 | El Hamamsy et al. | 361/56 |
| 4,628,398 | A | * | 12/1986 | Cook | 361/120 |
| 4,695,916 | A | * | 9/1987 | Satoh et al. | 361/56 |
| 4,758,920 | A | * | 7/1988 | McCartney | 361/119 |
| 4,852,145 | A | * | 7/1989 | Bevers et al. | 379/27.01 |
| 5,359,657 | A | * | 10/1994 | Pelegris | 379/412 |
| 5,416,663 | A | * | 5/1995 | Atkins | 361/119 |
| 5,493,469 | A | * | 2/1996 | Lace | 361/119 |
| 6,172,864 | B1 | | 1/2001 | Bremond et al. | |
| 6,992,874 | B2 | * | 1/2006 | Masghati | 361/119 |

OTHER PUBLICATIONS

French Search Report from French Patent Application 06/53166, filed Jul. 28, 2006.
Bollinger M.: "Bodyguards Fuer Slics/Neues Prinzip Bei Dedr Ueberspannungsableitung" Elektronik, WEKA Fachzeitschriftenverlag, Poing, DE, vol. 40, No. 20, Oct. 1, 1991, p. 132, 135, 138, XP000265904.

* cited by examiner

*Primary Examiner*—Danny Nguyen
(74) *Attorney, Agent, or Firm*—Lisa K. Jorgenson; James H. Morris; Wolf, Greenfield & Sacks, P.C.

(57) ABSTRACT

A circuit for protecting electronic equipment intended to be connected to at least one first conductor of a communication line, including, between this first conductor and a second conductor of the line or the ground to which is connected the equipment to be protected, at least one first branch including, in series, a first capacitive element and a first voltage-threshold triggering element, a first resistive element being connected in parallel with the first capacitive element.

8 Claims, 3 Drawing Sheets

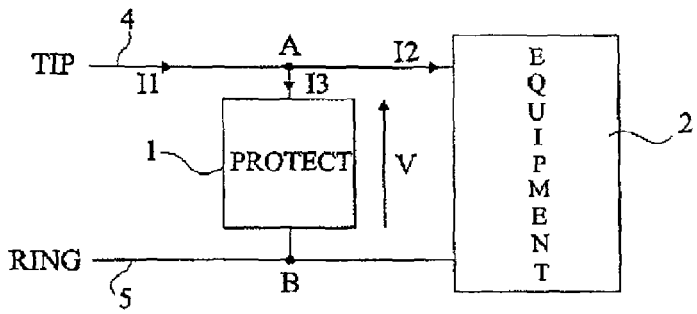
Fig 1
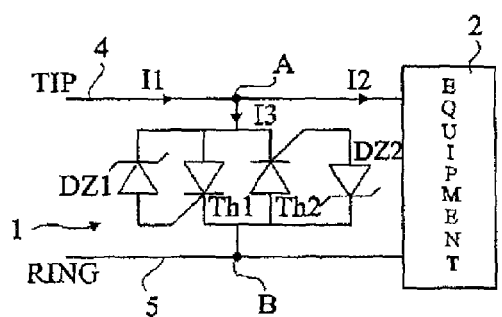
Fig. 2
(Prior Art)
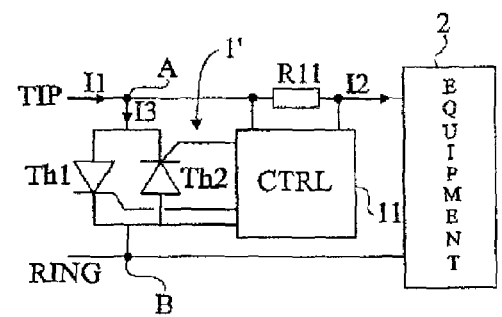
Fig 4
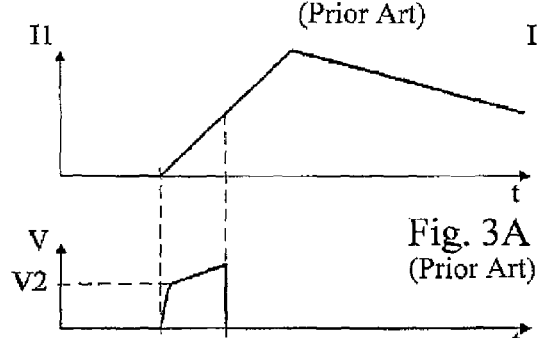
Fig. 3A (Prior Art)
Fig. 5A (Prior Art)
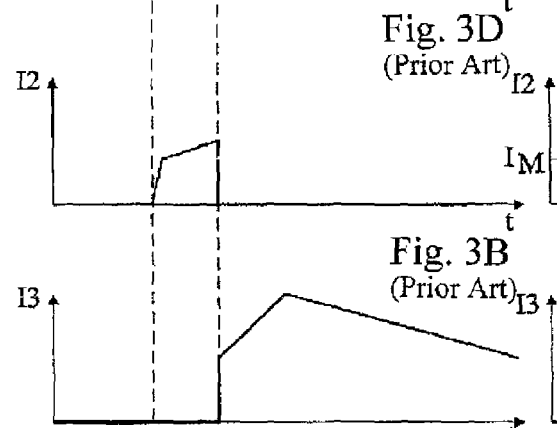
Fig. 3D (Prior Art)
Fig. 3B (Prior Art)
Fig. 3C (Prior Art)
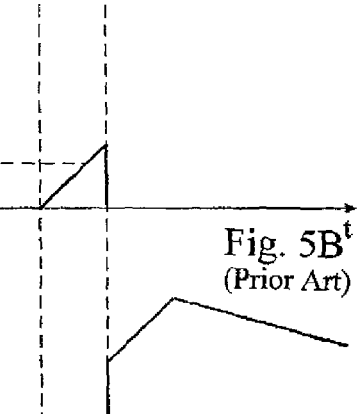
Fig. 5B (Prior Art)
Fig. 5C (Prior Art)

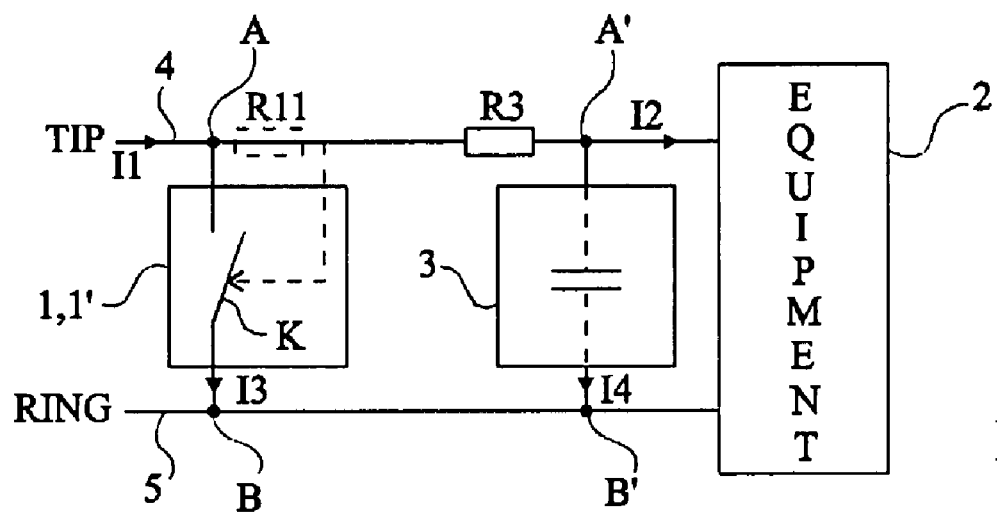
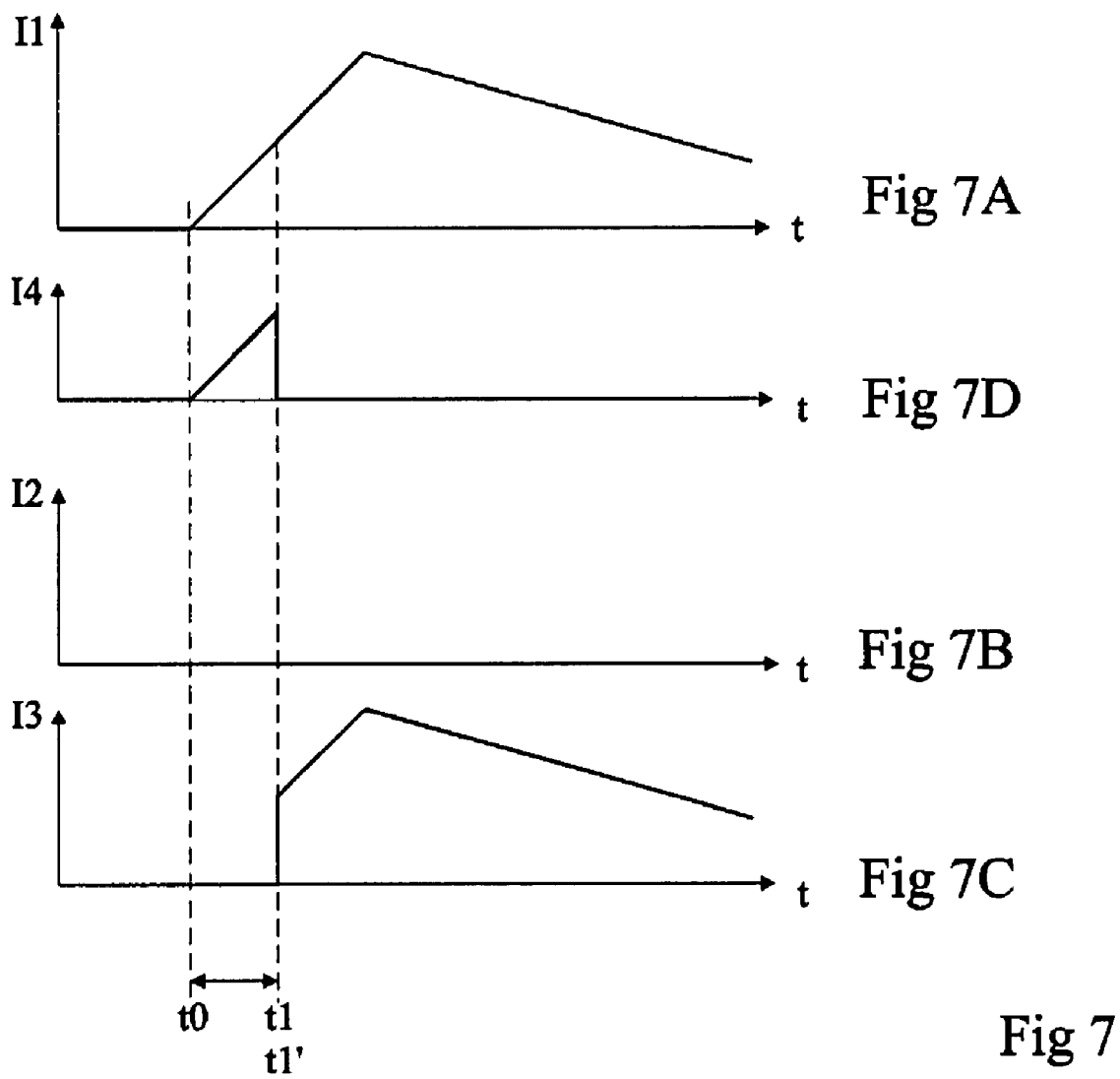
Fig 6
Fig 7A
Fig 7D
Fig 7B
Fig 7C
Fig 7

PROTECTION OF A COMMUNICATION LINE

BACKGROUND OF THE INVENTION

1. Field of the Invention

The present invention generally relates to communication lines and, more specifically, to the protection of electronic equipment connected to telecommunication lines, be they telephone lines or digital data transmission lines, including of so-called private networks, of Ethernet type. The present invention more specifically relates to the protection of equipment connected to communication lines with no galvanic isolation transformer between the equipment and the line.

2. Discussion of the Related Art

FIG. 1 is a schematic block diagram illustrating an example of assembly of a circuit 1 for protecting (PROTECT) an equipment 2 (EQUIPMENT) connected to a telephone line (conductors TIP 4 and RING 5). The equipment may be any appliance, device, circuit, or installation connected to the line. For example, it may be a telephone set, a communication board (of modem type), a subscriber card of a telecommunication exchange or a distribution frame, etc. Circuit 1 has the purpose of carrying off the overvoltages arriving on the line so that they do not reach equipment 2 which is connected therewith and thus avoiding damaging it. The protection comprises short-circuiting the two line conductors 4 and 5 together.

Overvoltages may have various origins, especially lightning and incidental connections of the communication line to the electric supply system.

FIG. 2 shows a first conventional embodiment of protection circuit 1. Circuit 1 comprises two thyristors Th1 and Th2 in parallel and in reverse directions between the two conductors 4 (TIP) and 5 (RING). The gates of thyristors Th1 and Th2 are connected to their respective anodes by a zener diode DZ1 or DZ2. The anodes of thyristors Th1 and Th2 are respectively connected to conductors 4 (terminal A) and 5 (terminal B). When an overvoltage with a peak value greater than the threshold value of one of zener diodes DZ1 or DZ2 occurs on the line (between the two conductors), a current is injected into the gate of the thyristor with which this diode is associated. The thyristor triggers, which causes a short-circuit between the two conductors and cancels the overvoltage to protect equipment 2 downstream.

FIGS. 3A, 3B, 3C, and 3D illustrate, in timing diagrams, the operation of protection circuit 1 of FIG. 2 in the presence of a disturbance on the line. FIG. 3A shows an example of shape of current I1 arriving on one of the line conductors (for example 4). FIG. 3B shows the shape of current I2 from terminal A to equipment 2. FIG. 3C shows the shape of current I3 between terminals A and B of the protection circuit. FIG. 3D shows the shape of voltage V between terminals A and B.

In normal operation (before a time t0), current I1 present on the line is negligible as compared with that flowing in case of an overcharge and is thus not shown in the drawings. Circuit 1 is inactive and current I2 is equal to current I1. The occurrence of a disturbance at a time to, by an increase in current I1, is assumed. The occurrence of this disturbance causes an increase in voltage V between terminals A and B. When this voltage reaches triggering threshold $V_Z$ (FIG. 3D) of one of the zener diodes (in the example of orientation of the currents taken in the drawings, diode DZ1), a current (a portion of current I1) is injected into a gate of one of the thyristors (here, Th1) until said thyristor turns on (time t1). From this time t1, terminals A and B are short-circuited and current I3 in protection circuit 1 becomes equal to current I1 (neglecting the resistive losses in the on switches). Between times t0 and t1, the protection circuit is not turned on yet so that current I3 is null. Current I2 running to equipment 2 then follows the shape of voltage V.

A disadvantage is that with miniaturizations and the increasing integration of the electronic units forming communication equipment 2, the temporary overcharges (between times t0 and t1) before triggering of the protection may be sufficient to damage the components. Typically, current I2 during the turn-on phase can reach several amperes for a few microseconds. Such a power can be sufficient to damage the equipment to be protected.

FIG. 4 is a schematic block diagram illustrating a second example of a circuit 1' for protecting a communication equipment 2. The principle is the same as in the first example, that is, establishing a short-circuit between conductors 4 and 5. As previously, two thyristors Th1 and Th2 are connected in parallel and in reverse directions between two terminals A and B respectively connected to conductors 4 and 5. The difference with the former assembly is the control of the thyristors which is performed by a circuit 11 (CTRL) measuring both the current between the two conductors and the current in one of them. In the example, the current is measured on conductor 4 by means of a current-to-voltage conversion resistor R11 interposed between terminal A and equipment 2. The terminals of resistor R11 are connected to circuit 11 which provides the signals for controlling the gates of thyristors Th1 and Th2. Circuit 11 generally draws its power supply from the line by having a terminal connected to terminal B (terminal on the conductor opposite to that having resistor R11) permanently connected between terminals A and B. This connection also enables measuring the voltage across the line to trigger the system in voltage mode as in the circuit of FIG. 2. When the current exceeds a threshold set by circuit 11, a control current is injected into one of the two gates according to the direction of the current, to turn on one of the two thyristors for, as in the case of FIG. 2, short-circuiting the line.

FIGS. 5A, 5B, and 5C illustrate, in timing diagrams, the operation of the protection circuit of FIG. 4. These drawings respectively show examples of shapes of currents I1 on conductor 4 upstream of the terminal A on the line side, I2 between terminal A and equipment 2, and I3 in circuit 1'. As previously, the coming of an overcharge is assumed at a time t0 from which current I1 increases, and current I2 follows the shape of current I1 as long as one of the thyristors is not turned on. Control circuit 11 triggers the turning-on from a current threshold $I_M$. As for the previous circuit, the turning-on of one of the thyristors is not immediate so that current I2 keeps on increasing until this turning-on. This current may, as previously, reach several tens of amperes for a few microseconds and may thus be sufficient to damage the equipment to be protected.

In both cases, the risk is all the greater as the disturbance is abrupt (lightning).

According to whether the equipment to be protected is in a telecommunication system placed on the subscriber side or on the exchange side, the situation is such as illustrated where the line is formed of two conductors 4 (TIP) and 5 (RING) which are short-circuited, or a situation not shown for the time when each line to be protected is formed of a single conductor grounded by a protection circuit of the type of those illustrates in FIGS. 2 and 4.

SUMMARY OF THE INVENTION

At least one embodiment of the present invention aims at overcoming all or part of the disadvantages of known communication line protection circuits.

At least one embodiment of the present invention more specifically aims at the problem of the turn-on time of switches short-circuiting the conductors of a line to be protected or grounding one of these conductors to carry off the overcharges.

At least one embodiment of the present invention also aims at a solution compatible with the fragility of the equipments to be protected.

At least one embodiment of the present invention also aims at a solution compatible be it on the subscriber side or on the exchange side of a telephone network.

At least one embodiment of the present invention further aims at a solution applicable to data communication networks.

To achieve all or part of these objects, as well as others, an embodiment of the present invention provides a circuit for protecting electronic equipment intended to be connected to at least one first conductor of a communication line, comprising, between this first conductor and a second conductor of the line or the ground to which is connected the equipment to be protected, at least one first branch comprising, in series, a first capacitive element and a first voltage-threshold triggering element, a first resistive element being connected in parallel on the first capacitive element.

According to an embodiment of the present invention, the first branch further comprises a first diode in series.

According to an embodiment of the present invention, a second branch comprises, in series, a second capacitive element and a second voltage triggering element, a second resistive element being connected in parallel with the second capacitive element.

According to an embodiment of the present invention, the second branch further comprises a second diode in series.

According to an embodiment of the present invention, the voltage triggering thresholds are selected to be greater than the maximum voltage of the normal signals conveyed by the communication line.

According to an embodiment of the present invention, said voltage triggering element(s) are formed of zener diodes.

An embodiment of the present invention also provides a device for protecting electronic equipment intended to be connected to at least one first conductor of a communication line, comprising, in parallel between this first conductor and a second conductor of the line, or the ground to which is connected the element to be protected:

at least one capacitive protection circuit; and at least one protection circuit of the type short-circuiting the first and second conductors or connecting the first conductor to ground.

According to an embodiment of the present invention, an additional resistive element is interposed, on the first conductor, between the two protection circuits.

The present invention also provides a method for protecting an electronic equipment intended to be connected to at least one first conductor of a communication line, combining a protection short-circuiting this first conductor with a second conductor of the line or connecting this first conductor to ground, with a capacitive protection grounding the first and second conductors or the first conductor.

The foregoing and other objects, features, and advantages of the present invention will be discussed in detail in the following non-limiting description of specific embodiments in connection with the accompanying drawings.

BRIEF DESCRIPTION OF THE DRAWINGS

FIG. 1, previously described, shows an example of a system of connection on a telecommunication network of the type to which the present invention applies;

FIG. 2, previously described, shows a first conventional example of a protection circuit;

FIGS. 3A, 3B, 3C, and 3D, previously described, illustrate in timing diagrams the operation of the circuit of FIG. 2;

FIG. 4, previously described, shows a second conventional example of embodiment of a protection circuit;

FIGS. 5A, 5B, and 5C, previously described, illustrate in timing diagrams the operation of the circuit of FIG. 4;

FIG. 6 is a schematic block diagram illustrating an embodiment of a protection device according to the present invention;

FIGS. 7A, 7B, 7C, and 7D illustrate, in timing diagrams, the operation of the protection device of FIG. 6;

DETAILED DESCRIPTION

Figure 8:
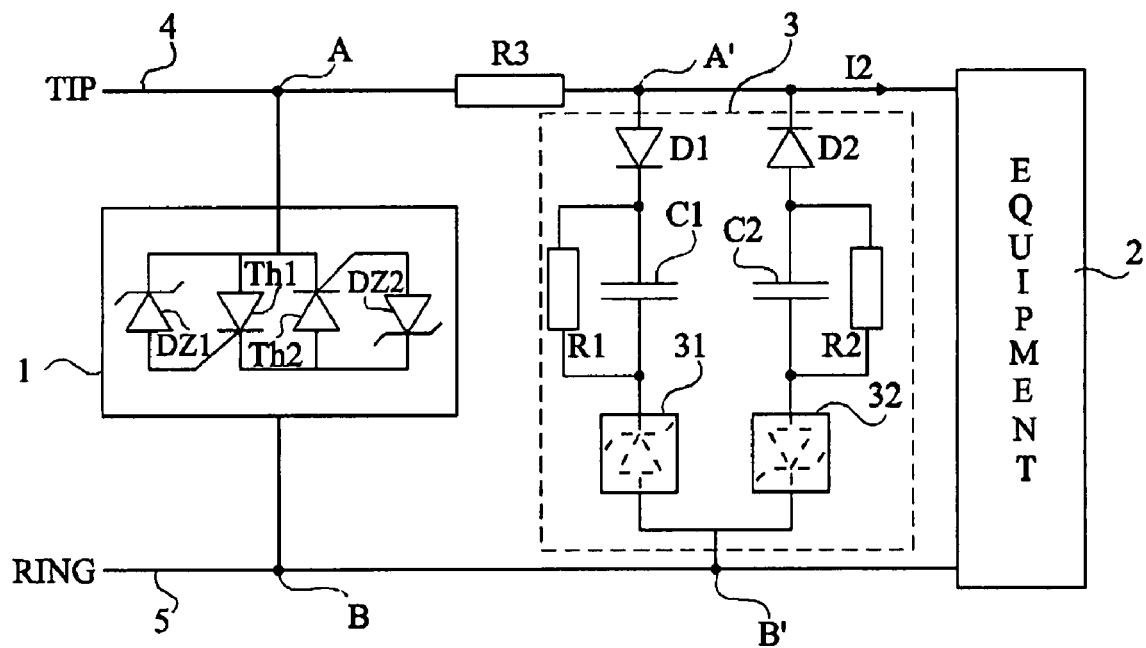
FIG. 8 shows an embodiment of the device of FIG. 6 in an example of environment.

The same elements have been designated with the same reference numerals in the different drawings which are not drawn to scale. For clarity, only those elements which are useful to the understanding of the present invention have been shown and will be described. In particular, the equipments to be protected by a line protection device have not been detailed, the present invention being compatible with any conventional equipment to which a short-circuit protection device applies.

According to an aspect of the present invention, the beginning of an overcharge (before turning-on of a circuit with switches forming a short-circuit) is processed by a capacitive circuit arranged between a short-circuiting circuit and an equipment to be protected.

FIG. 6 is a schematic block diagram illustrating a line protection system according to an aspect of the present invention. The case of a line with two conductors 4 (TIP) and 5 (RING), on the subscriber side of a telephony network, is assumed. A circuit 1 or 1' with a switch or switches K is connected, on the line side, between terminals A and B, upstream of equipment 2 to be protected. In FIG. 6, a circuit 1' has been illustrated in dotted lines with its resistor R11 and its second connection to conductor 4 for the current-to-voltage conversion.

A capacitive circuit 3 connects conductors 4 and 5 between circuit 1 (or 1') and equipment 2. A first terminal A' of circuit 3 is connected to conductor 4. A second terminal B' is connected to conductor 5. Circuit 3 is preferably bidirectional and its function is to connect terminals A' and B' with at least one capacitive element to carry off the beginning of the overcharges before short-circuiting circuit 1 (or 1') intervenes. Preferably, a resistor R3 is interposed between terminals A and A'.

It could have been devised to connect terminals A' and B' directly with a capacitor. However, such a solution would have been incompatible with normal operation of telecommunication systems. In particular, the hooking off and on of a handset may generate overvoltages on the line and thus turn on such a system. Further, modem-type digital transmission systems using the telecommunication networks increasingly have fast (high-frequency) signals which require low line capacitances to remain exploitable by the connected equipment.

FIGS. 7A, 7B, 7C, and 7D illustrate, in timing diagrams, the operation of a protection device according to the present invention. FIG. 7A shows an example of the shape of current I1. FIG. 7B shows the shape of current I2 on the side of the equipment to be protected. FIG. 7C illustrates the shape of current I3 in short-circuiting circuit 1 or 1'. FIG. 7D illustrates the shape of current I4 in capacitive circuit 3.

As previously, the occurrence of an overcharge at a time t0 from which current I1 on the line starts significantly increasing and a turning-on of a short-circuiting protection circuit at a time t1 or t1' are assumed. For simplification, times t1 or t1' have been illustrated as simultaneous, but the turn-on delays of circuits 1 (voltage measurement) and 1' (current measurement) in practice have no reason to be identical.

Since the overcharge occurring on the line is abrupt, it is first absorbed by capacitive circuit 3 as illustrated by the growth of current I4 between times t0 and t1 (or t1'). Accordingly, current I2 on the side of the equipment to be protected remains zero over the entire overcharge period.

FIG. 8 shows an embodiment of a capacitive circuit 3 in its environment. A circuit 1 of the type in FIG. 2 is assumed, but it may also be a circuit of the type in FIG. 4 and, more generally, of any type of short-circuiting circuit with switches.

According to this embodiment, circuit 3 is formed of two branches in parallel between terminals A' and B'. Each branch comprises, in series, a diode D1, respectively D2, a capacitive element C1, respectively C2, and a voltage threshold turn-on element 31, respectively 32. Resistors R1 and R2 are respectively connected in parallel on capacitive elements C1 and C2. Diodes D1 and D2 are in reverse directions from one branch to the other to be respectively assigned to the overcharges in one direction and in the other.

Devices 31 and 32 with a voltage threshold (for example, zener diodes) are selected to exhibit, respectively in one direction or in the other, a turn-on threshold greater than the maximum normal voltage on the line (generally, the so-called battery voltage). Their function is to only activate the carrying off of an overvoltage by capacitive elements C1 and C2 for signals greater than this normal voltage. Accordingly, signals such as those occurring on off/on hookings, as well as data transmission signals of ADSL or VDSL type, etc. do not turn on the circuit.

The function of resistors R1 and R2 is to discharge respective capacitances C1 and C2 once the overvoltage has disappeared. Such resistors are selected with significant values (several megaohms) to preserve a normal line operation on discharge of elements C1 and C2.

Diodes D1 and D2 enable decreasing the value of the stray capacitances seen from the line to make the device compatible with digital transmission systems.

Optional resistor R3 maintains a voltage between terminals A and A', so that the triggering of capacitive protection 3 does not adversely affect the turning-on of short-circuiting protection circuit 1 or 1'. Resistor R3 is selected to have a relatively low value (with respect to the line resistance) to avoid introducing a series resistance that may adversely affect the normal line operation. In the case of a circuit with switches of the type of that in FIG. 4, the role of resistor R3 may be played by resistor R11.

The connection order of the short-circuiting and capacitive circuits between the line and the equipment to be protected should be respected if a resistor R3 is used, the capacitive device having to be between the switch circuit and the equipment to be protected.

According to distinct and combinable variations:
threshold triggering circuits 31 and 32 are formed either of "zener"-type components or of "short-circuiting"-type components.

As a specific example of embodiment, a protection circuit 3 such as illustrated in FIG. 8 has been formed with the following components:
capacitors C1 and C2: 1 microfarad;
resistors R1 and R2: 10 megaohms;
resistor R3: 1 ohm;
zener diodes DZ31 and DZ32: 65 volts; and
diodes D1 and D2: 1 ampere, 300 volts.

Figure 9:
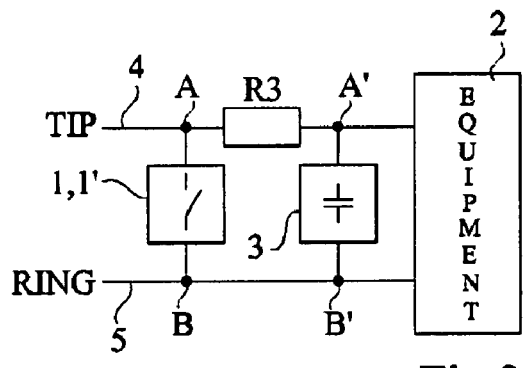
FIG. 9 is a schematic block diagram illustrating a first example of application of a protection device.
Figure 10:
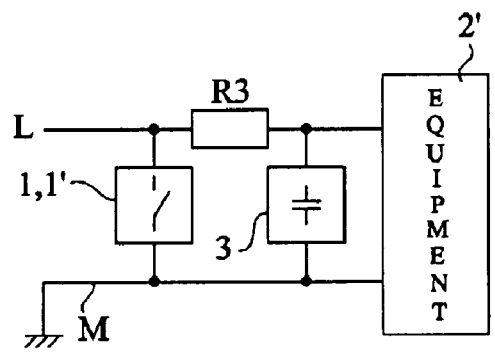
FIG. 10 is a schematic block diagram illustrating a second example of application of a protection device.
Figure 11:
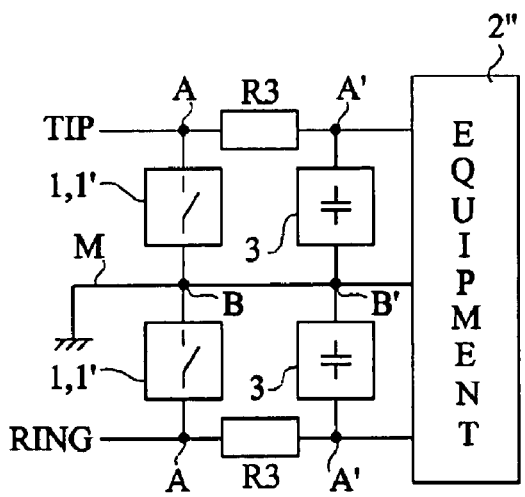
FIG. 11 is a schematic block diagram illustrating a third example of application of a protection device.

FIGS. 9, 10, and 11 illustrate three examples of possible assembly of a protection device according to the present invention to protect an equipment 2 to be connected to a communication line.

FIG. 9 shows a first case which corresponds to the case described as an example in the preceding drawings, that is, of an equipment 2 on the subscriber side of a telecommunication network, the equipment being intended to be connected to two TIP and RING conductors of a line. Short-circuiting and capacitive circuits 1 (or 1') and 3 are intended to connect conductors 4 and 5 of the line in case of an overcharge.

FIG. 10 shows the case where a single line conductor (for example, TIP or RING, but more generally a conductor L) is used by equipment 2' to be protected. Such is, for example, the case of an Ethernet-type network. In this case, line L to be protected is connected by circuits 1 (or 1') and 3 to ground M.

FIG. 11 shows the case of an equipment 2" (for example, an electronic distribution board) on the exchange side of a telecommunication network. The TIP and RING conductors are individually protected by circuits 1, 1', and 3 connecting them to ground M. It can be here considered that there are in fact two lines to be protected.

Of course, the present invention is likely to have various alterations, modifications, and improvements which will readily occur to those skilled in the art. In particular, the selection of the thresholds to be given to triggering elements 31 and 32 depends on the application and on the telecommunication network for which the protection circuit is intended. The dimensions to be given to the capacitive and resistive elements are within the abilities of those skilled in the art. Further, for the case where overcharge risks would be of a single biasing, the capacitive protection circuit may be reduced to a single branch.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for protecting electronic equipment intended to be connected to at least one first conductor of a communication line, comprising, between the at least one first conductor and a second conductor of the communication line or a ground to which is connected the equipment to be protected, at least one first branch and a second branch, the at least first branch comprising, in series, a first capacitive element and a first voltage-threshold triggering element, and a first resistive element connected in parallel on the first capacitive element, and the second branch parallel to the first branch and that comprises, in series, a second capacitive element and a second voltage-threshold triggering element, a second resistive element being connected in parallel with the second capacitive element.

2. The circuit of claim 1, wherein the first branch further comprises a first diode in series.

3. The circuit of claim 1, wherein the second branch further comprises a second diode in series.

4. The circuit of claim 1, wherein the voltage-threshold triggering elements have thresholds that are selected to be greater than the maximum voltage of the normal signals conveyed by the communication line.

5. The circuit of claim 1, wherein said voltage-threshold triggering elements are formed of zener diodes.

6. The circuit of claim 1, incorporated into a device for protecting electronic equipment intended to be connected to at least one first conductor of a communication line, the device comprising, in parallel between this first conductor and a second conductor of the line, or the ground to which is connected the element to be protected:

at least one protection circuit of the type short-circuiting the first and second conductors or connecting the first conductor to ground.

7. The device of claim 6, wherein the at least one protection circuit comprises two protection circuits, and a resistive element is interposed, on the first conductor, between the two protection circuits.

8. A circuit for protecting electronic equipment intended to be connected to at least one first conductor of a communication line, comprising:

at least one first conductor and one of a second conductor or a ground;

at least one first branch between the at least one first conductor and one of a second conductor or the ground, the at least one first branch comprising, in series, a first capacitive element and a first voltage-threshold triggering element;

a first resistive element connected in parallel to the first capacitive element; a resistive element on the communication line; and a second branch, parallel to the first branch, and between the at least one first conductor and one of the second conductor or the ground, the at least one first branch and that includes, in series, a second capacitive element and a second voltage-threshold triggering element, a second resistive element being connected in parallel with the second capacitive element.

* * * * *

UNITED STATES PATENT AND TRADEMARK OFFICE
CERTIFICATE OF CORRECTION

PATENT NO. : 7,746,618 B2  Page 1 of 1
APPLICATION NO. : 11/881177
DATED : June 29, 2010
INVENTOR(S) : André Bremond et al.

It is certified that error appears in the above-identified patent and that said Letters Patent is hereby corrected as shown below:

Col. 1, line 61, should read:
rence of a disturbance at a time t0, by an increase in current I1, Col. 2, line 48, should read:
conductor 4 upstream of the terminal A on the line side, I2

Claim 4, col. 7, line 19, should read:
greater than the maximum voltage of normal signals con- Signed and Sealed this Tenth Day of August, 2010

David J. Kappos
*Director of the United States Patent and Trademark Office*